US012151632B2

(12) United States Patent
Eiswerth et al.

(10) Patent No.: US 12,151,632 B2
(45) Date of Patent: Nov. 26, 2024

(54) RESTRAINT CONTROL SYSTEMS AND METHODS

(71) Applicant: Veoneer US Safety Systems, LLC, Southfield, MI (US)

(72) Inventors: David Eiswerth, White Lake, MI (US); Carl Munch, Troy, MI (US)

(73) Assignee: VEONEER US SAFETY SYSTEMS, LLC, Southfield, MI (US)

( * ) Notice: Subject to any disclaimer, the term of this patent is extended or adjusted under 35 U.S.C. 154(b) by 215 days.

(21) Appl. No.: 17/577,333

(22) Filed: Jan. 17, 2022

(65) Prior Publication Data

US 2023/0226992 A1   Jul. 20, 2023

(51) Int. Cl.
| | |
|---|---|
| *B60R 21/01* | (2006.01) |
| *B60R 11/00* | (2006.01) |
| *B60R 11/04* | (2006.01) |
| *B60R 21/0136* | (2006.01) |
| *B60R 21/015* | (2006.01) |
| *B60R 22/46* | (2006.01) |
| *B60R 22/48* | (2006.01) |

(52) U.S. Cl.
CPC .............. *B60R 21/01* (2013.01); *B60R 11/04* (2013.01); *B60R 21/0136* (2013.01); *B60R 21/01512* (2014.10); *B60R 21/01554* (2014.10); *B60R 22/46* (2013.01); *B60R 22/48* (2013.01); *B60R 2011/0003* (2013.01)

(58) Field of Classification Search
CPC .............. B60R 21/01; B60R 21/01512; B60R 21/01554; B60R 11/04; B60R 21/0136; B60R 22/46; B60R 22/48; B60R 2011/0003
See application file for complete search history.

(56) References Cited

U.S. PATENT DOCUMENTS

| | | | |
|---|---|---|---|
| 5,967,549 | A | 10/1999 | Allen et al. |
| 9,731,628 | B1 | 8/2017 | Rao et al. |
| 9,744,929 | B2 | 8/2017 | Rao et al. |
| 2007/0139185 | A1 | 6/2007 | Nathan et al. |
| 2008/0255731 | A1* | 10/2008 | Mita ................. B60R 21/01538 701/45 |

FOREIGN PATENT DOCUMENTS

JP      2020142545 A  *  9/2020  ............. B60R 11/04

OTHER PUBLICATIONS

Machine Translation of JP2020142545A PDF File Name: "JP2020142545A_Machine_Translation.pdf".*
International Search Report and Written Opinion for International Application No. PCT/US2023/010684 mailed May 3, 2023.

* cited by examiner

*Primary Examiner* — Grant Moubry
*Assistant Examiner* — Ruben Picon-Feliciano (57) ABSTRACT

A restraint control system of a vehicle includes: a position module configured to determine positions of seats within a passenger cabin of the vehicle; a restraint control module configured to, in response to detection of a collision of the vehicle: select which ones of the restraints of the vehicle to activate based on the positions of the seats; activate the selected restraints of the vehicle; and not activate non-selected ones of the restraints.

18 Claims, 12 Drawing Sheets

|  | Activate? | | | | |
|---|---|---|---|---|---|
|  | R1 | R2 | R3 | ... | RM |
| S1 occupancy | Y | N | Y |  | Y |
| S2 occupancy | Y | N | N |  | Y |
| ... |  |  |  |  |  |
| SN occupancy | N | Y | Y |  | Y |

|  | Activate? | | | | |
|---|---|---|---|---|---|
|  | R1 | R2 | R3 | ... | RM |
| Direction/Location 1 | N | Y | N |  | Y |
| Direction/Location 2 | Y | N | N |  | Y |
| ... |  |  |  |  |  |
| Direction/Location J | Y | N | N |  | Y |

|  | Activate? | | | | |
|---|---|---|---|---|---|
|  | R1 | R2 | R3 | ... | RM |
| S1 Direction | N | N | N |  | N |
| S2 Direction | Y | Y | N |  | Y |
| ... |  |  |  |  |  |
| SN Direction | Y | Y | N |  | N |

|  | Activate? | | | | |
|---|---|---|---|---|---|
|  | R1 | R2 | R3 | ... | RM |
| S1 Position | N | N | N |  | N |
| S2 Position | Y | Y | N |  | Y |
| ... |  |  |  |  |  |
| SN Position | Y | Y | N |  | N |

FIG. 12

RESTRAINT CONTROL SYSTEMS AND METHODS

FIELD

The present disclosure relates to vehicle restraint control systems and methods and more particularly to systems and methods for controlling restraints of vehicles with variable seat configurations and/or directions.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Vehicles include occupant restraints that are configured to restrain vehicle occupants, such as for vehicle collisions. One type of restraint is a seatbelt. A seatbelt pretensioner may be actuated to tighten a seatbelt under some circumstances, such as in response to detection of a collision.

Another type of restraint is an airbag. A vehicle may include multiple different types of airbags. One type of airbag is front passenger airbags. A passenger front airbag may be disposed for example behind a dashboard in front of a front seat passenger. A driver front airbag may be disposed, for example, in a steering wheel. Other types of airbags include knee airbags, hip airbags, occupant to occupant airbags, roof rail (side curtain) airbags, side impact airbags, rear airbags, and other types of airbags. An inflation device may be actuated to inflate an airbag under some circumstances, such as in response to detection of a collision.

SUMMARY

In a feature, a restraint control system of a vehicle includes: a position module configured to determine positions of seats within a passenger cabin of the vehicle; a restraint control module configured to, in response to detection of a collision of the vehicle: select which ones of the restraints of the vehicle to activate based on the positions of the seats; activate the selected restraints of the vehicle; and not activate non-selected ones of the restraints.

In further features, the seats engaged with pairs of tracks on a floor of the passenger, the pairs of tracks arranged parallel to a longitudinal axis of the vehicle.

In further features, the position module is configured to determine the positions of the seats based on output from sensors configured to generate the output based on movement of the seats along the pairs of tracks.

In further features, the position module is configured to determine the positions of the seats based on signal strength indicators of radio frequency (RF) signals transmitted and received within the passenger cabin.

In further features, the position module is configured to determine the positions of the seats based on one or more images of the passenger cabin captured using one or more cameras.

In further features, the restraint control module is configured to select which restraints of the vehicle to activate further based on a location of the collision.

In further features, the restraints include at least airbags and seatbelt pretensioners.

In further features, the restraint control module is configured to select which restraints of the vehicle to activate further based on directions that the seats are facing.

In further features, the restraint control module is configured to select which restraints of the vehicle to activate further based on indicators of whether the seats, respectively, are occupied or not.

In further features, the restraint control module is configured to select which ones of the restraints of the vehicle to activate using a lookup table that relates seat positions, seat directions, seat occupancy, and collision location to restraints to select.

In a feature, a restraint control method for a vehicle includes: determining positions of seats within a passenger cabin of the vehicle; in response to detection of a collision of the vehicle: selecting which ones of the restraints of the vehicle to activate based on the positions of the seats; activating the selected restraints of the vehicle; and not activating non-selected ones of the restraints.

In further features, the seats engaged with pairs of tracks on a floor of the passenger, and the pairs of tracks arranged parallel to a longitudinal axis of the vehicle.

In further features, determining the positions of the seats includes determining the positions of the seats based on output from sensors configured to generate the output based on movement of the seats along the pairs of tracks.

In further features, determining the positions of the seats includes determining the positions of the seats based on signal strength indicators of radio frequency (RF) signals transmitted and received within the passenger cabin.

In further features, determining the positions of the seats includes determining the positions of the seats based on one or more images of the passenger cabin captured using one or more cameras.

In further features, selecting which restraints of the vehicle to activate includes selecting which restraints of the vehicle to activate further based on a location of the collision.

In further features, the restraints include at least airbags and seatbelt pretensioners.

In further features, selecting which restraints of the vehicle to activate includes selecting which restraints of the vehicle to activate further based on directions that the seats are facing.

In further features, selecting which restraints of the vehicle to activate includes selecting which restraints of the vehicle to activate further based on indicators of whether the seats, respectively, are occupied or not.

In further features, selecting which restraints of the vehicle to activate includes selecting which restraints of the vehicle to activate using a lookup table that relates seat positions, seat directions, seat occupancy, and collision location to restraints to select.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicle restraints can be triggered/deployed/activated in response to detection of a collision of the vehicle with another object. For example, airbags and seat tensioners may be triggered/deployed in response to detection of a frontal collision of the vehicle.

Some vehicles, however, can include variable seat configurations. For example, seats may be linearly moveable forward and backward within a passenger cabin of a vehicle along tracks. Additionally, vehicle seats may be removeable from and addable to a vehicle. Additionally, vehicle seats may be positionable (e.g., rotatable) in two or more different directions, such as a forward direction of the vehicle, a rearward direction of the vehicle, and positions between forward and rearward.

The present application involves a restraint control module that selects which one or more restraints to trigger/deploy/activate based on seat positions with the passenger cabin, seat (facing) directions, collision side, and occupancy of seats. This may increase occupant protection in the event of a collision while also not unnecessarily deploying restraints when not needed, such as given seat positions, occupancy status, and/or seat orientation.

Figure 1:
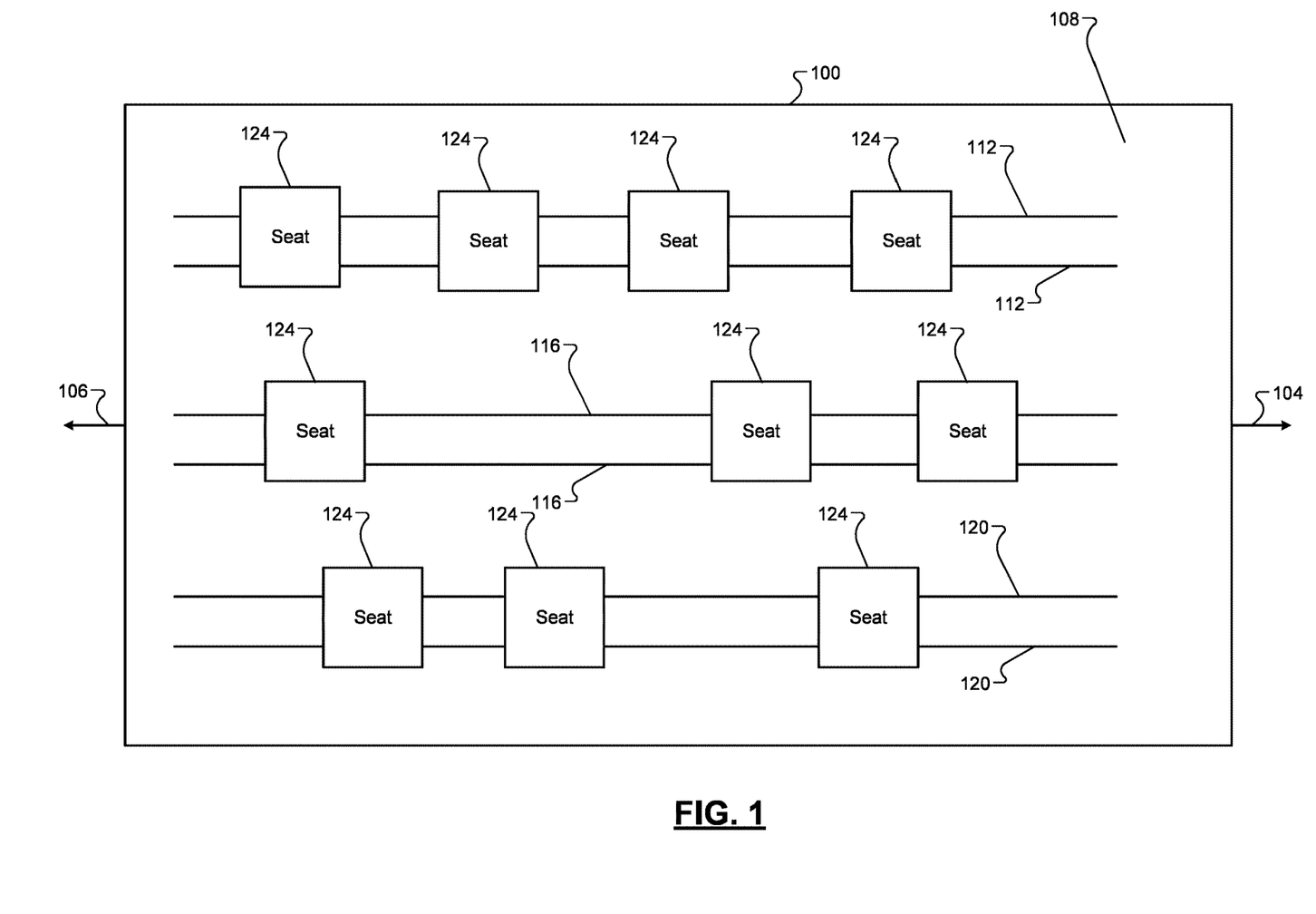
FIG. 1 is a top view of an example vehicle.

FIG. 1 is a top view of an example vehicle 100. The vehicle 100 may be a vehicle including an internal combustion engine, an electric vehicle including one or more electric motors not including an internal combustion engine, a hybrid vehicle including an electric motor and an internal combustion engine, or another suitable type of vehicle. The vehicle 100 may be an autonomous vehicle, a non-autonomous vehicle, or a semiautonomous vehicle. The vehicle 100 may be a ride share vehicle or may be a non-shared vehicle.

The vehicle 100 includes one or more propulsion devices, such as at least one of an electric motor and an internal combustion engine, that generate propulsion torque that is used to propel the vehicle 100. Forward and backward directions of the vehicle 100 are illustrated by arrows 104 and 106. In vehicles that do not have a designated front and rear, front and rear (or back) may be interchangeable and may be expressed relative to the motion of the vehicle.

The vehicle 100 includes a passenger cabin 108. One or more pairs of tracks are formed in a floor of the passenger cabin 108. For example, the vehicle 100 includes a first pair of tracks 112, a second pair of tracks 116, and a third pair of tracks 120. While the example of three pairs of tracks is provided, the present application is also applicable to one pair of tracks, two pairs of tracks, and more than three pairs of tracks. The tracks of each pair of tracks are parallel. For example, the tracks 112 of the first pair of tracks are parallel.

One or more seats 124 are coupled to pairs of tracks. While an example numbers and arrangement of seats is shown in FIG. 1, the present application is also applicable to other numbers and arrangements of seats. The seats 124 may be removable and decouplable from the tracks such that seats can be added to or removed from the passenger cabin 108.

Figure 11:
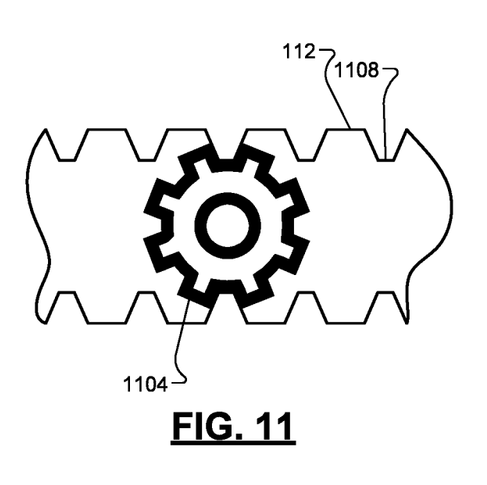
FIG. 11 includes an example cross-sectional view of a track and a gear that engages teeth in the track.

The tracks may be parallel to a longitudinal axis of the vehicle 100 and parallel to a longitudinal direction of the vehicle 100. The seats 124 are moveable linearly along the pairs of tracks to which they are coupled. The seats 124 may each include an electric motor that is configured to linearly move its seat along the pair of tracks to which the seat is coupled. For example, the tracks may include teeth, and the electric motor of a seat may drive gears that engage the teeth of the tracks to move the seat linearly. The seats 124 may also be positionable facing one, two, or more than two different directions. For example, the seats 124 may be positionable to face the direction 104 and positionable to face the direction 106. The seats 124 may also be positionable to face other directions. FIG. 11 includes an example cross-sectional view of a track 112 and a gear 1104 that engages teeth 1108 in the track 112. While an example gear and track system is provided, the present application is also applicable to other types of gear systems, such as worm gears.

Figure 2:
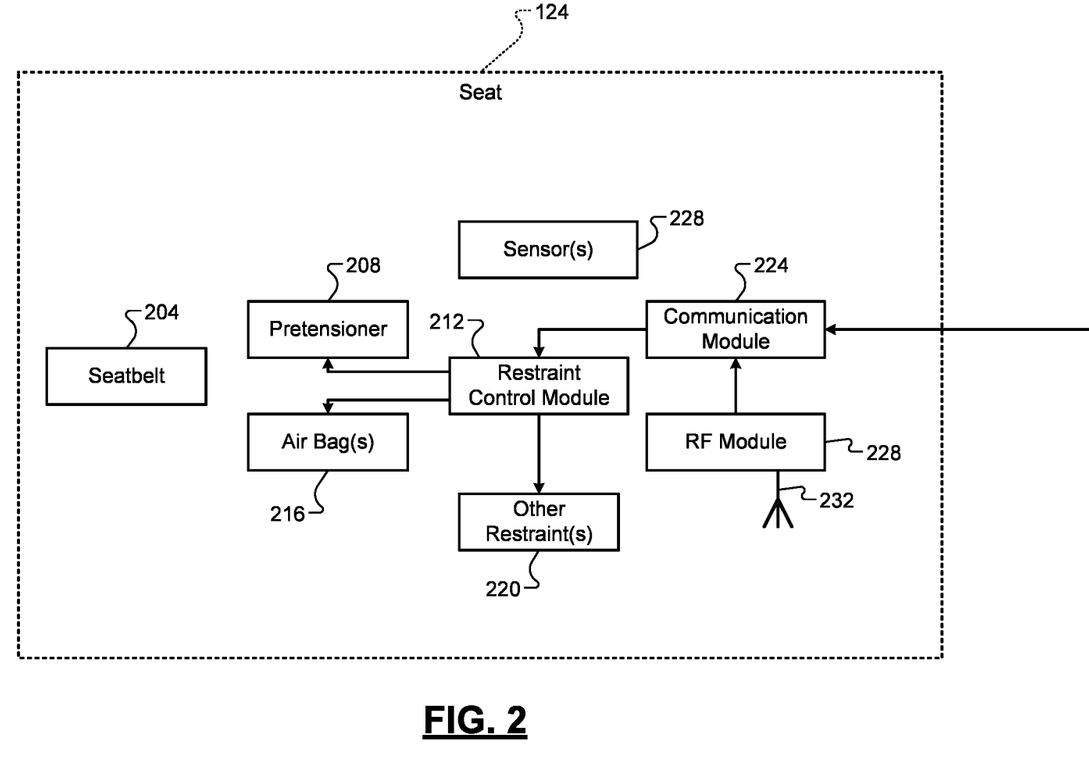
FIG. 2 is a functional block diagram of a portion of a seat.

FIG. 2 is a functional block diagram of a portion of a seat 124. Each of the seats 124 may include the same components.

The seat 124 includes a seatbelt 204 that configured to belt a passenger to the seat 124. A pretensioner 208 may be included to tighten the seatbelt 204 when triggered by a restraint control module 212. The seat 124 may include one or more airbags 216, such as a seatbelt airbag, one or more seat side (e.g., curtain) airbags, hip airbags, occupant to occupant airbags, and/or one or more other suitable types of airbags. The seat 124 may also include one or more other restraints 220.

The restraint control module 212 selectively actuates/triggers the pretensioner 208, deployment of the airbag(s) 216, and the other restraint(s) 220 (collectively referred to as "restraints"). The restraint control module 212 may actuate/trigger one or more of the restraints of the seat 124 in response to a command from a communication module 224 and/or based on measurements from one or more sensors, such as one or more accelerometers. The communication module 224 communicates with other modules of the vehicle, such as discussed further below. The restraint control module 212 may selectively actuate/trigger one or more of the restraints of the seat 124 even when communication with one or more other modules of the vehicle 100 is severed.

The seat 124 includes a radio frequency (RF) module 228. The RF module 228 includes an RF receiver and may include an RF transmitter. In various implementations, the RF module 228 may include an RF transceiver. The RF module 228 receives RF signals via one or more antennas, such as antenna 232. The RF module 228 may determine a signal strength indicator (value), such as a relative signal strength indicator (RSSI) based on characteristics of RF signals received. The signal strength indicator of a received RF signal and a unique identifier of an RF transmitter that transmitted the received signal may be communicated to one or more modules, such as discussed further below.

Signal strength indicators of multiple RF signals received from multiple different RF transmitters may be used to determine a position of the seat 124 within the passenger cabin 108. Additionally or alternatively, the position of the seat 124 may be determined based on one or more other types of data. For example, a position sensor (e.g., a variable reluctance or hall effect sensor) may determine a linear position of the seat 124 based on rotation of the gears driven by the electric motor of the seat 124. The position sensor may, for example, increment or decrement the linear position of the seat 124 based rotation of the gear(s) coupled to the tracks of the seat. The position of the seat 124 may be determined based on the linear position of the seat 124 on its pair of tracks and predetermined position information of the pair of tracks. Additionally or alternatively, one or more cameras may be used to capture images of the passenger cabin 104, and the position of the seat 124 may be determined based on the positions of the seat 124 within the image(s), for example, using a lookup table and/or an equation. Additionally or alternatively, encoders may be provided along each track, and the outputs of the encoders may be used to determine the positions of the seats. The seats may also include a mass sensor that measures a mass present on the seat. A restraint control module may determine whether a seat is occupied based on images captured using a camera (e.g. the seat includes an object having a shape of a human), using the masses measured by the mass sensors (e.g., the mass is greater than a predetermined mass), or in another suitable manner. In various implementations, seat belt bucking may be detected using an image from a camera, from a seat belt sensor, or in another suitable manner. The restraint control module may control actuation/deployment of airbags and/or restraints based on whether a seatbelt is buckled around an occupant of a seat or not.

Figure 3:
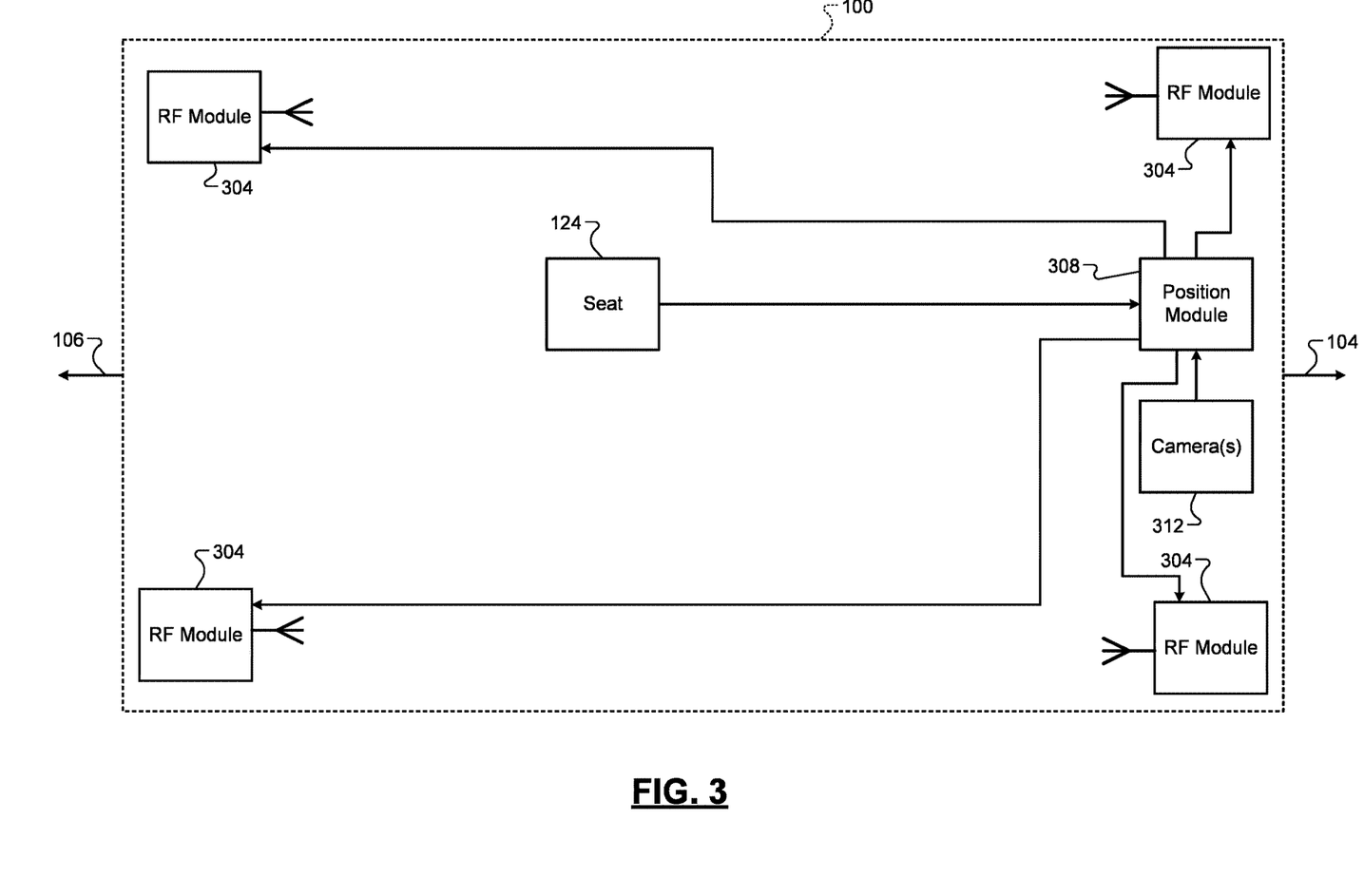
FIG. 3 is another top view of the vehicle.

FIG. 3 is another top view of the vehicle 100. Multiple RF modules 304 selectively may transmit RF signals and their respective unique identifiers within the passenger cabin 108, such as when prompted by a position module 308. The RF modules 304 may be located, for example, at front and rear left and right sides of the vehicle 100. The RF modules 304 transmit RF signals via one or more antennas, respectively.

The RF modules of the seats 124, such as the RF module 228 determine signal strength indicators based on the received signals, respectively, from the RF modules 304. The RF modules of the seats 124 communicate the signal strength indicators and the received unique identifiers, respectively, to the position module 308. The position module 308 may determine the locations of the RF modules 304 based on the unique identifiers, respectively. The position module 308 may determine the (present) position of the seat 124 within the passenger cabin 108 based on the signal strength indicators for the RF modules 304 and the locations of the RF modules 304, such as using triangulation.

Additionally or alternatively, the position module 308 may determine the position of the seat 124 based on the measurements from the position sensor of the seat 124. Additionally or alternatively, the position module 308 may determine the position of the seat 124 based on images of the passenger cabin 108 captured using one or more cameras 312. For example, the position module 308 may detect the seat 124 in an image captured using a camera using an object detection algorithm. The position module 308 may determine the position of the seat 124 within the passenger cabin 108, for example, based on a number of pixels of an image occupied by the seat 124 and a pixel location of the seat 124 in the image.

Figure 4:
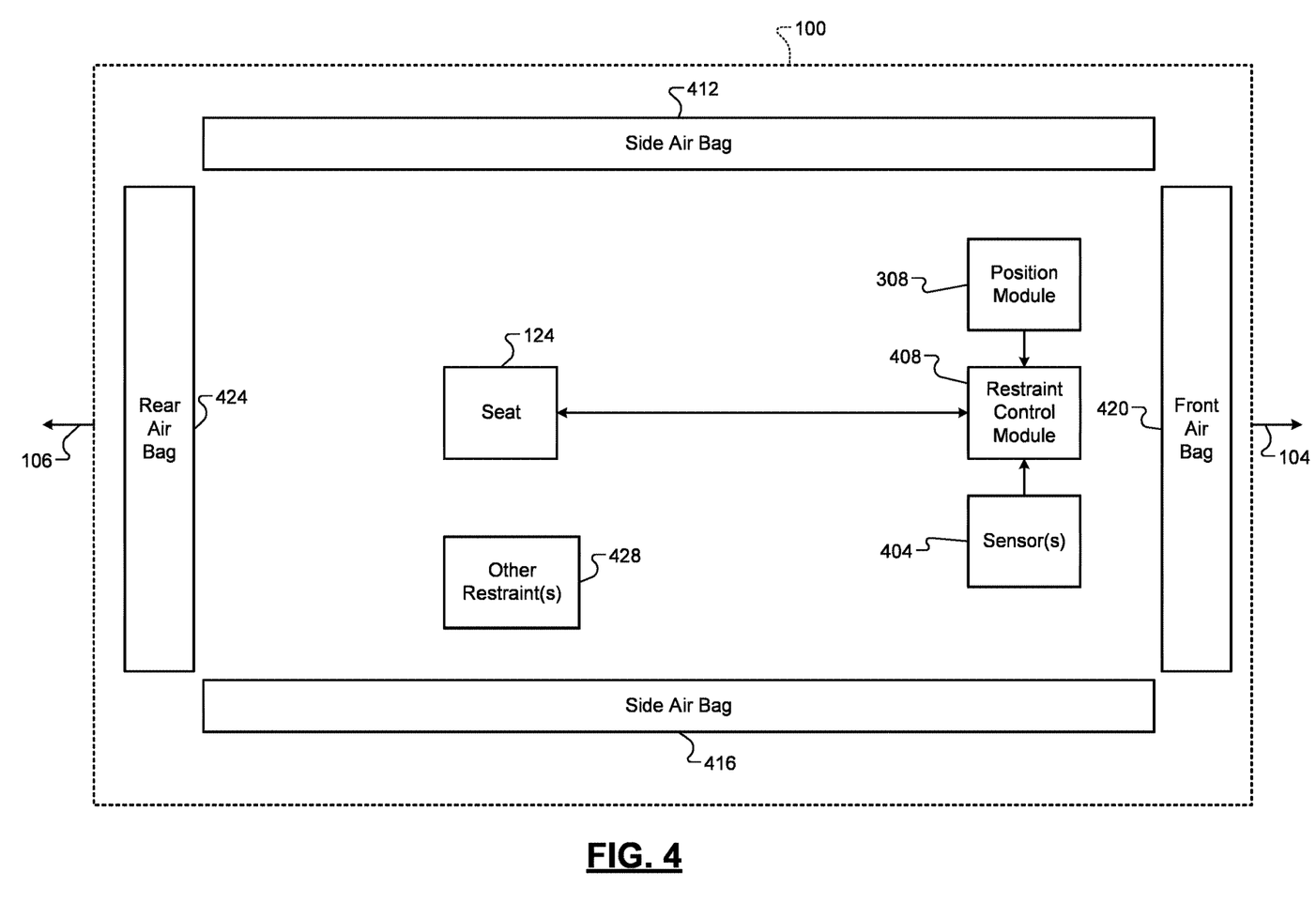
FIG. 4 is a functional block diagram of an example portion of the vehicle.

FIG. 4 is a functional block diagram of an example portion of the vehicle 100. The vehicle 100 includes one or more sensors 404 that indicate when a collision between the vehicle 100 and an object occur. The sensors 404 may be, for example, accelerometers or another suitable type of crash sensor. In various implementations, the vehicle 100 may include a sensor configured to indicate when a frontal collision of the vehicle 100 occurs, a sensor configured to indicate when a rear collision of the vehicle 100 occurs, a sensor configured to indicate when a left side collision of the vehicle 100 occurs, and a sensor configure to indicate when a right side collision of the vehicle 100 occurs. The vehicle 100 may include one or more other sensors that indicate when one or more other collisions occur.

The vehicle 100 includes one or more airbags, such as a left side airbag 412, a right side airbag 416, a front airbag 420, a rear airbag 424. While example airbags are shown, the vehicle 100 may additionally include one or more other airbags. In various implementations, the vehicle 100 may include multiple left side airbags, multiple right side airbags, multiple front airbags, and/or multiple rear airbags. The vehicle 100 may also include one or more other restraints 428. While example airbags and restraints are provided, the present application is also applicable to other arrangements of airbags and/or restraints. Also, one or more airbags and/or one or more restraints may be included with one, more than one, or each seat, such as discussed above.

A restraint control module 408 selectively and individually actuates/triggers deployment of the airbags and the other restraint(s) 428. The restraint control module 408 also selectively and individually commands the restraint control modules 212 to actuate/trigger the restraints of the seats 124. As discussed above, the restraint control modules 212 of the seats 124 may selectively actuate/trigger one or more of the restraints of the seats 124, respectively, even when communication with the restraint control module 408 is severed in response to detection of a collision.

When a collision occurs, the restraint control module 408 and the restraint control modules 212 determine which restraints of the seats 124 (e.g., FIG. 2) and the vehicle (e.g., FIG. 4) to trigger/deploy based on the positions of the seat(s) 124, respectively, and the location of the collision. The restraint control module and the restraint control modules 212 trigger/deploy the determined restraints. The restraint control module 408 may determine which restraints to trigger/deploy using a lookup table that relates collision directions, seat positions, seat occupancy, and seat directions to which restraints to deploy and not deploy. Seat directions may be determined by a restraint control module, for example, using images from cameras and/or seat direction (e.g., rotational position) sensors.

Figure 12:
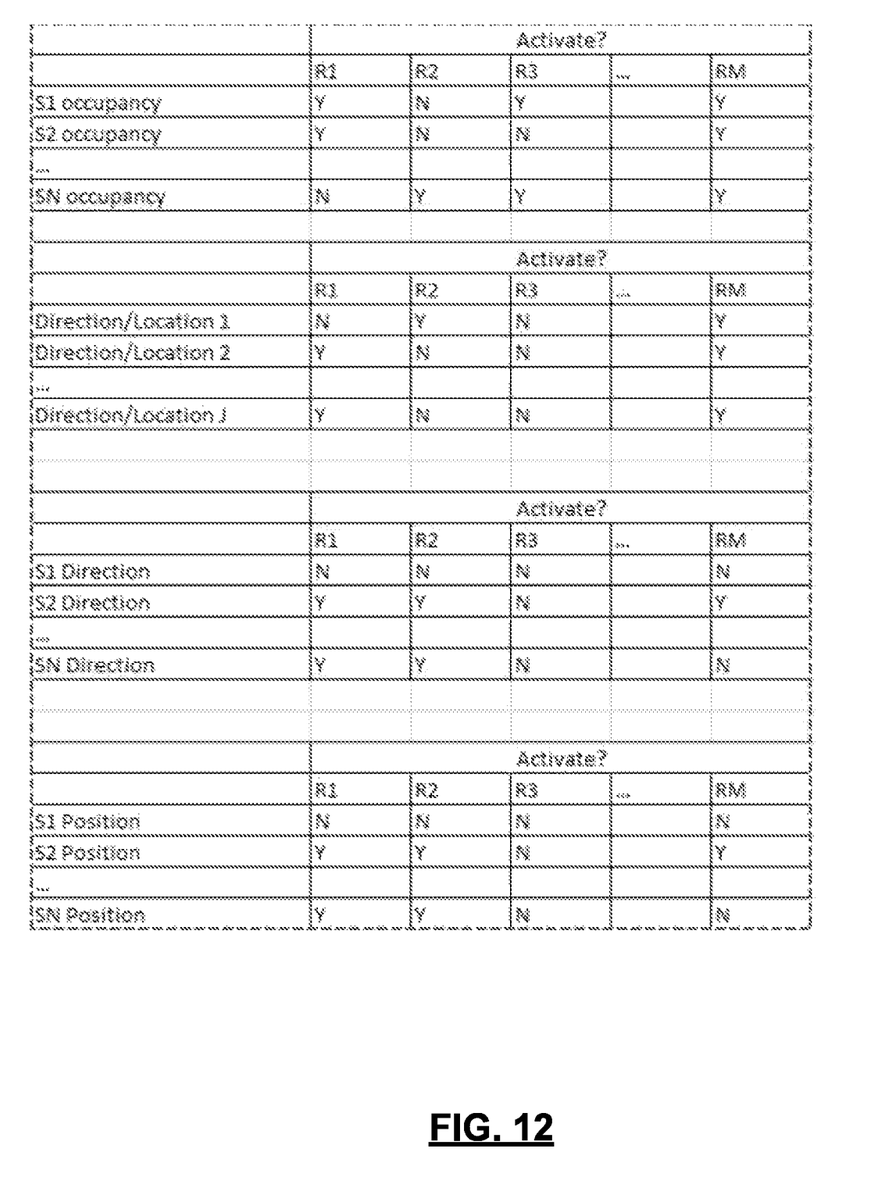
FIG. 12 includes example tables of trigger/deploy indicators (Y/N) for each restraint (R1-RM) for different seat occupancies, collision direction/locations, seat facing directions, and seat positions.

FIG. 12 includes example tables of trigger/deploy indicators (Y/N) for each restraint (R1-RM) for different seat occupancies, collision direction/locations, seat facing directions, and seat positions. The restraint control module may determine whether to deploy/trigger each restraint using example tables similar to those of FIG. 12. For example, the restraint control module may deploy/trigger each restraint having a Y in at least one of the tables.

Figure 5:
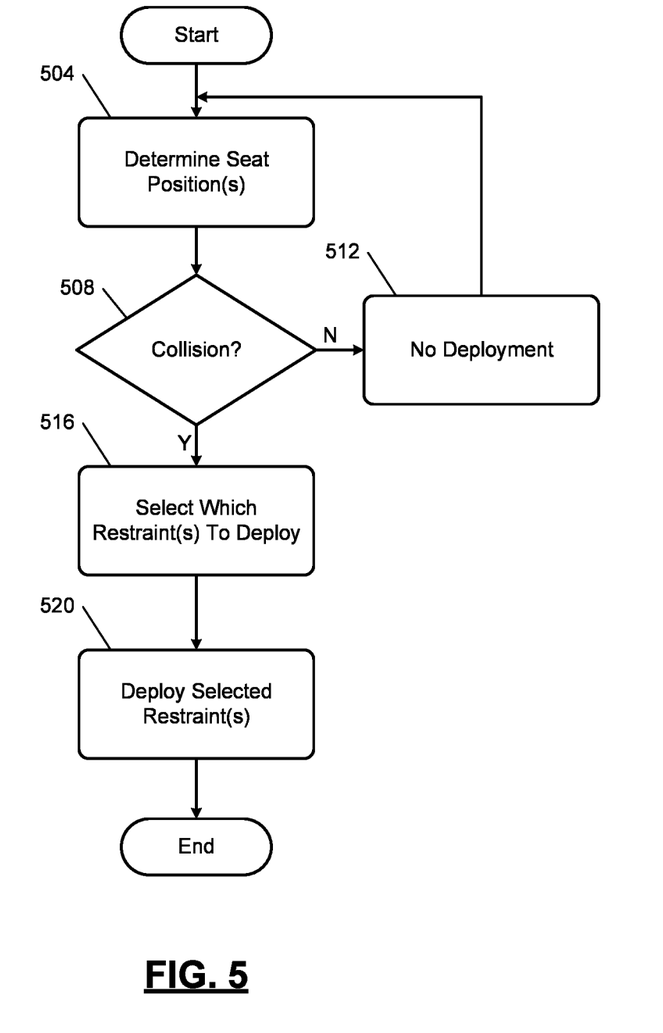
FIG. 5 is a flowchart depicting an example method of controlling restraint deployment.

FIG. 5 is a flowchart depicting an example method of controlling restraint deployment. Control begins with 504 where the position module 308 determines the positions of the seats 124 within the passenger cabin 108. The position module 308 also determines directions that the seats 124 are facing. For example, the position module 308 triggers the RF modules 304 to at different times (e.g., in a predetermined order) output RF signals and their unique identifiers. The RF modules 228 of the seats 124 determine signal strength indicators for each RF signal received and transmit the signal strength indicators and the unique identifiers. The position module 308 determines the positions of the seats 124, respectively, based on the signal strength indicators of the RF signals received from the RF modules 304, respectively, and the positions of the RF modules 304, such as using triangulation. Additionally or alternatively, the position module 308 may determine the positions of the seats 124, respectively, based on images of the passenger cabin 108 and/or the positions measured by the position sensors of the seats 124, respectively.

At 508, the restraint control module 408 and/or the restraint control modules 212 determine whether a collision of the vehicle 100 with one or more objects have occurred and, if so, a direction (e.g., front, rear, right side, left side, etc.) of the collision. If 508 is true, control continues with 516. If 508 is false, the restraint control module and the restraint control modules 212 may determine to not deploy any restraints at 512, and control may return to 504.

At 516, the restraint control module 408 and/or the restraint control modules 212 selects which restraints to trigger/deploy (and which restraints to not trigger/deploy) based on the collision, the collision direction, and the positions of the seats 124. At 520, the restraint control module 408 and/or the restraint control modules 212 triggers/deploys the selected restraint(s). While control is shown as ending, control may return to 504.

Figure 6:
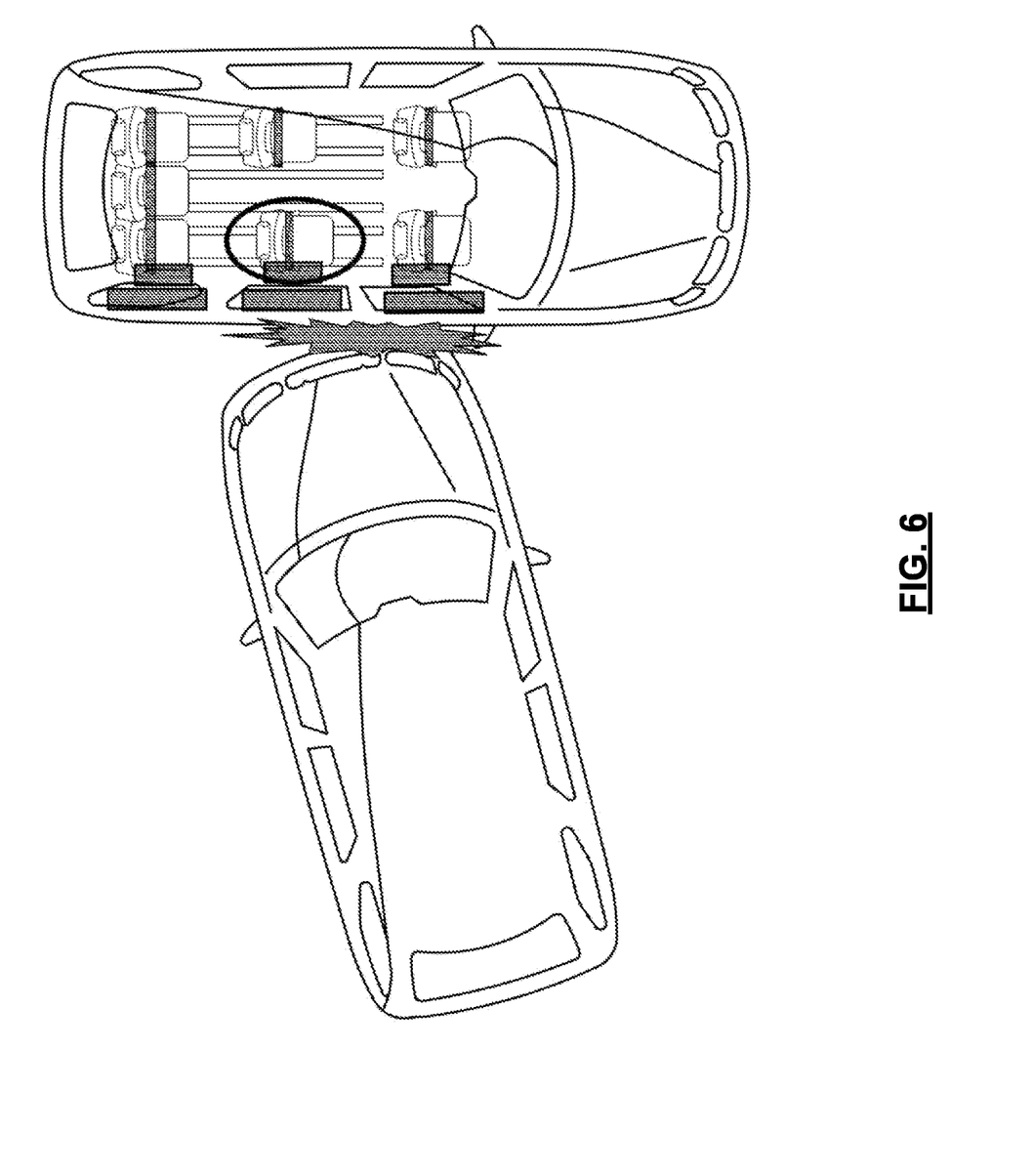
FIG. 6 is an illustration of an example seat arrangement and right side collision.

FIG. 6 is an illustration of an example seat arrangement and side (right side) collision. In this example, all of the seats are facing the forward direction. For the example of FIG. 6, based on the seat directions, the collision direction, the seat occupancy, etc., the restraint control module 408 may trigger/deploy right side curtain airbags for all rows, the pretensioners for all of the seats, and seat side airbags of the seats on the right most side of the vehicle (where the collision occurred). In various implementations, the restraint control module 408 may not deploy restraints of unoccupied seats.

Figure 7:
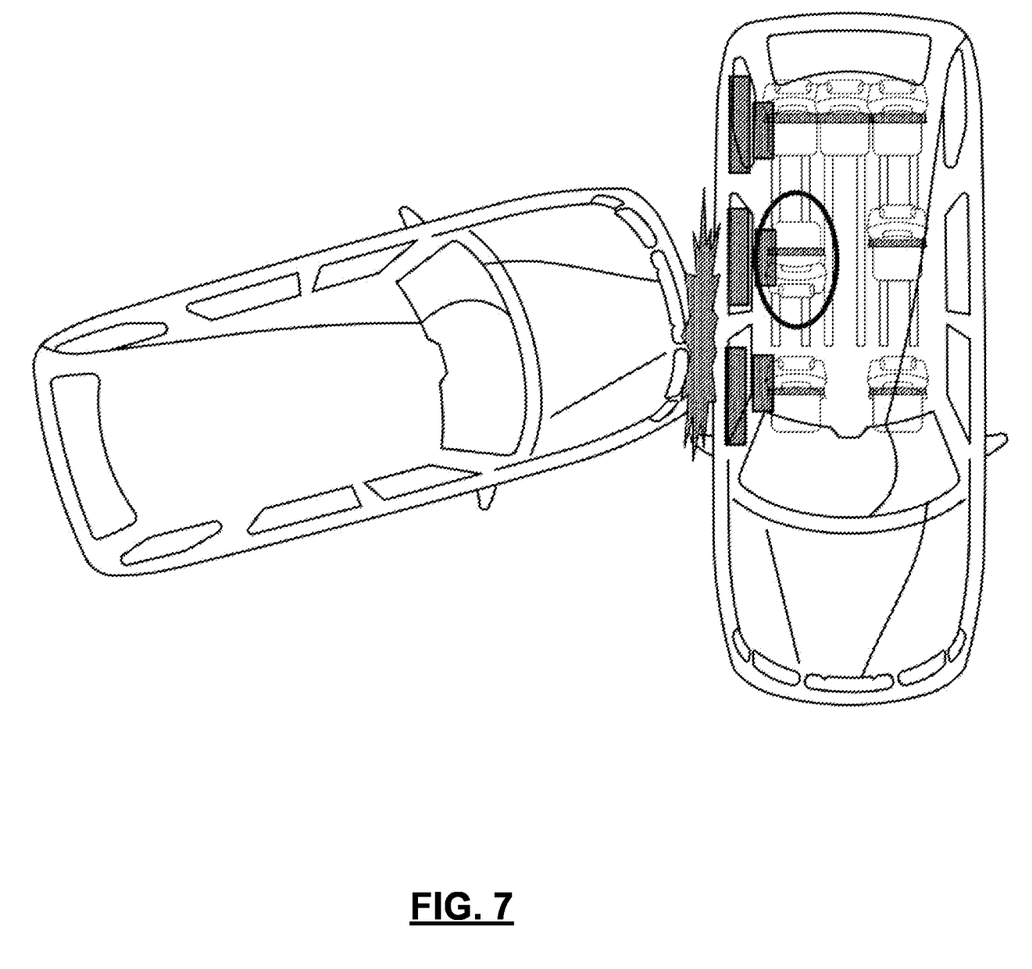
FIG. 7 is an illustration of an example seat arrangement and right side collision.

FIG. 7 is an illustration of an example seat arrangement and side (right side) collision. In the example of FIG. 7, the circled seat has been rotated to face rearward. This is unlike FIG. 6 where all of the seats are facing forward. For the example of FIG. 7, based on the seat directions, the collision direction, the seat occupancy, etc., the restraint control module 408 may trigger/deploy right side curtain airbags for all rows, the pretensioners for all of the seats, and seat side airbags of the seats on the right most side of the vehicle (where the collision occurred). In various implementations, the restraint control module 408 may not deploy restraints of unoccupied seats. Because the circled seat is facing rearward in the example of FIG. 7, its left seat side airbag may be deployed. The restraint control module 408 may determine which restraints to trigger/deploy based on the directions that the seats are facing.

Figure 8:
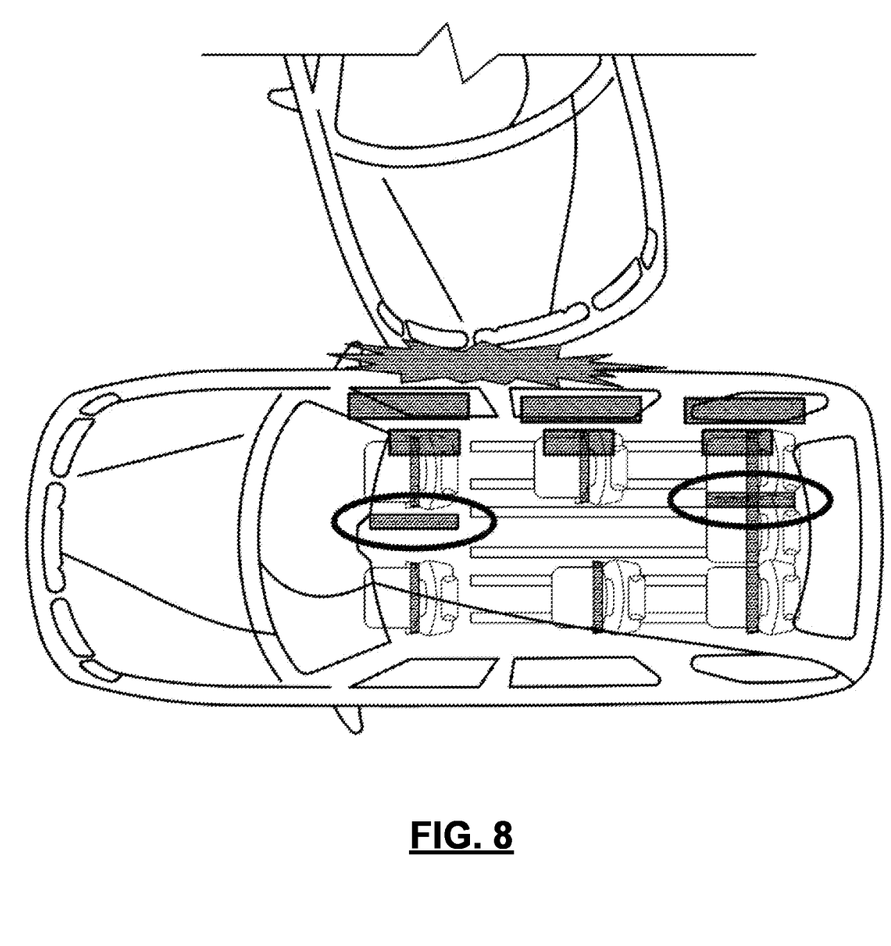
FIG. 8 is an illustration of an example seat arrangement and right side collision.

FIG. 8 is an illustration of an example seat arrangement and side (right side) collision. For the example of FIG. 8, based on the seat directions, the collision direction, the seat occupancy, etc., the restraint control module 408 may trigger/deploy right side curtain airbags for all rows, the pretensioners for all of the seats, and seat side airbags of the seats on the right most side of the vehicle (where the collision occurred). In various implementations, the restraint control module 408 may not deploy restraints of unoccupied seats. The restraint control module 408 may deploy occupant to occupant air bags circled in FIG. 8 to minimize or prevent one occupant from colliding with another occupant in response to the collision. The circled occupant to occupant air bags are disposed between seats and can be deployed between adjacent seats with occupants.

Figure 9:
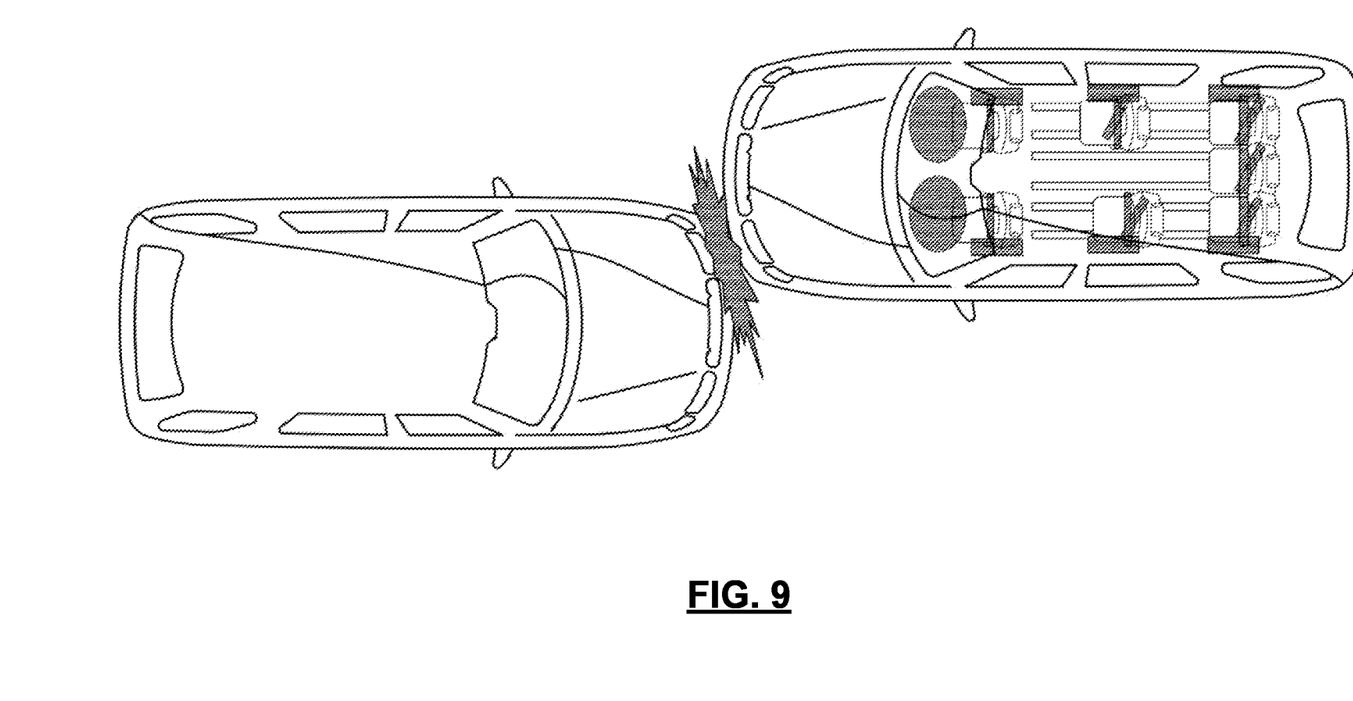
FIG. 9 is an illustration of an example seat arrangement and offset front side collision.

FIG. 9 is an illustration of an example seat arrangement and offset front side collision. For the example of FIG. 9, the restraint control module 408 may trigger/deploy frontal airbags, the pretensioners for all of the seats based on the seat directions, the collision direction, the seat occupancy, etc. Seat side airbags of the seats may also be triggered/deployed. In various implementations, the restraint control module 408 may not deploy restraints of unoccupied seats.

Figure 10:
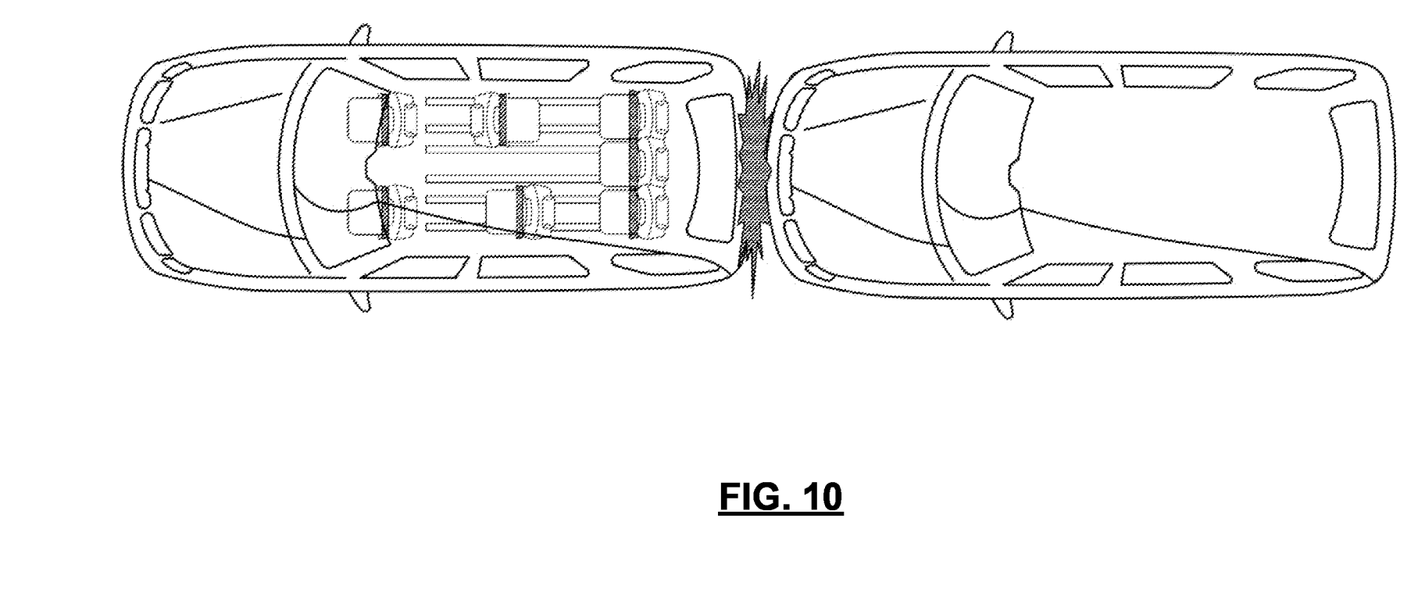
FIG. 10 is an illustration of an example seat arrangement and rear side collision.

FIG. 10 is an illustration of an example seat arrangement and rear side collision. For the example of FIG. 10, based on the seat directions, the collision direction, the seat occupancy, etc., the restraint control module 408 may trigger/deploy the pretensioners for all of the seats. The restraint control module 408 may not trigger/deploy any airbags. In various implementations, the restraint control module 408 may not deploy restraints of unoccupied seats.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A restraint control system of a vehicle, comprising:
a position module configured to determine positions of two or more seats within a passenger cabin of the vehicle,
wherein the seats are engaged with pairs of tracks on a floor of the passenger, the pairs of tracks arranged parallel to a longitudinal axis of the vehicle, and sets of two or more seats are disposed on each pair of tracks;
a restraint control module configured to, in response to detection of a collision of the vehicle:
select which ones of the restraints of the vehicle to activate based on the positions of the seats;
activate the selected restraints of the vehicle; and
not activate non-selected ones of the restraints.

2. The restraint control system of claim 1 wherein the position module is configured to determine the positions of the seats based on output from sensors configured to generate the output based on movement of the seats along the pairs of tracks.

3. The restraint control system of claim 1 wherein the position module is configured to determine the positions of the seats based on signal strength indicators of radio frequency (RF) signals transmitted and received within the passenger cabin.

4. The restraint control system of claim 1 wherein the position module is configured to determine the positions of the seats based on one or more images of the passenger cabin captured using one or more cameras.

5. The restraint control system of claim 1 wherein the restraint control module is configured to select which restraints of the vehicle to activate further based on a location of the collision.

6. The restraint control system of claim 1 wherein the restraints include at least airbags and seatbelt pretensioners.

7. The restraint control system of claim 1 wherein the restraint control module is configured to select which restraints of the vehicle to activate further based on directions that the seats are facing.

8. The restraint control system of claim 1 wherein the restraint control module is configured to select which restraints of the vehicle to activate further based on indicators of whether the seats, respectively, are occupied or not.

9. The restraint control system of claim 1 wherein the restraint control module is configured to select which ones of the restraints of the vehicle to activate using a lookup table that relates seat positions, seat directions, seat occupancy, and collision location to restraints to select.

10. A restraint control method for a vehicle, comprising:
by one or more processors, determining positions of two or more seats within a passenger cabin of the vehicle, wherein the seats are engaged with pairs of tracks on a floor of the passenger, the pairs of tracks arranged parallel to a longitudinal axis of the vehicle, and sets of two or more seats are disposed on each pair of tracks;
in response to detection of a collision of the vehicle, by the one or more processors:
selecting which ones of the restraints of the vehicle to activate based on the positions of the seats;
activating the selected restraints of the vehicle; and
not activating non-selected ones of the restraints.

11. The restraint control method of claim 10 wherein determining the positions of the seats includes determining the positions of the seats based on output from sensors configured to generate the output based on movement of the seats along the pairs of tracks.

12. The restraint control method of claim 10 wherein determining the positions of the seats includes determining the positions of the seats based on signal strength indicators of radio frequency (RF) signals transmitted and received within the passenger cabin.

13. The restraint control method of claim 10 wherein determining the positions of the seats includes determining the positions of the seats based on one or more images of the passenger cabin captured using one or more cameras.

14. The restraint control method of claim 10 wherein selecting which restraints of the vehicle to activate includes selecting which restraints of the vehicle to activate further based on a location of the collision.

15. The restraint control method of claim 10 wherein the restraints include at least airbags and seatbelt pretensioners.

16. The restraint control method of claim 10 wherein selecting which restraints of the vehicle to activate includes selecting which restraints of the vehicle to activate further based on directions that the seats are facing.

17. The restraint control method of claim 10 wherein selecting which restraints of the vehicle to activate includes selecting which restraints of the vehicle to activate further based on indicators of whether the seats, respectively, are occupied or not.

18. The restraint control method of claim 10 wherein selecting which restraints of the vehicle to activate includes selecting which restraints of the vehicle to activate using a lookup table that relates seat positions, seat directions, seat occupancy, and collision location to restraints to select.

* * * * *

UNITED STATES PATENT AND TRADEMARK OFFICE
CERTIFICATE OF CORRECTION

| | | |
|---|---|---|
| PATENT NO. | : 12,151,632 B2 | Page 1 of 1 |
| APPLICATION NO. | : 17/577333 | |
| DATED | : November 26, 2024 | |
| INVENTOR(S) | : David Eiswerth et al. | |

It is certified that error appears in the above-identified patent and that said Letters Patent is hereby corrected as shown below:

In the Claims

Column 10, Line 35: insert -- cabin -- after "passenger"

Column 11, Line 14: insert -- cabin -- after "passenger"

Signed and Sealed this
Twenty-eighth Day of January, 2025

Coke Morgan Stewart
*Acting Director of the United States Patent and Trademark Office*